(12) United States Patent
Takemoto

(10) Patent No.: US 7,083,292 B2
(45) Date of Patent: Aug. 1, 2006

(54) SHEETS FOR PLASMA DISPLAY PANELS AND PROCESS FOR PRODUCING THE SAME

(75) Inventor: Hiroyuki Takemoto, Himeji (JP)

(73) Assignee: Daicel Chemical Industries, Ltd., Sakai (JP)

(*) Notice: Subject to any disclaimer, the term of this patent is extended or adjusted under 35 U.S.C. 154(b) by 190 days.

(21) Appl. No.: 10/790,072

(22) Filed: Mar. 2, 2004

(65) Prior Publication Data
US 2004/0191548 A1  Sep. 30, 2004

(30) Foreign Application Priority Data
Mar. 28, 2003  (JP) .............................. 2003-091000

(51) Int. Cl.
*G02B 27/00* (2006.01)
(52) U.S. Cl. ...................... 359/613; 359/614; 428/212
(58) Field of Classification Search ................ 428/120, 428/212; 359/613, 614
See application file for complete search history.

(56) References Cited
U.S. PATENT DOCUMENTS
4,128,685 A    12/1978  Lowrey et al.
5,254,388 A *  10/1993  Melby et al. ............... 428/120

FOREIGN PATENT DOCUMENTS
JP    53-70834 A     6/1978
JP    6-504627 A     5/1994
JP    2002-196128 A  7/2002
JP    2002-319351 A  10/2002
WO    WO 92/11549    7/1992

* cited by examiner

Primary Examiner—Alexander S. Thomas
(74) Attorney, Agent, or Firm—Birch, Stewart, Kolasch & Birch, LLP

(57) ABSTRACT

A PDP resin sheet 11 capable of transmitting a rectilinear light is prepared by alternately arranging a transparent section 12 and a dark section 13 in the direction of the sheet surface. The transparent section 12 and the dark section 13 may be formed perpendicular or inclined to the sheet surface, respectively. In the sheet 11, the thickness T of the sheet may be about 0.12 to 0.25 mm, and the angle of the dark section 13 to the sheet surface may be about 70 to 90°. In addition, the ratio [P/T] of the periodical width P of the dark section relative to the thickness T of the sheet may be about 1/1 to 1/2, and the ratio $[W_1/W_2]$ of the width $W_1$ of the transparent section relative to the width $W_2$ of the dark section may be about 30/1 to 10/1. Soft resins constituting the transparent section and the dark section may for example be an olefinic resin (particularly an ethylene-vinyl ester copolymer). Such a PDP sheet ensures an image display at high contrast even under a daylight environment, without reducing a plasma display luminance.

12 Claims, 4 Drawing Sheets

SHEETS FOR PLASMA DISPLAY PANELS AND PROCESS FOR PRODUCING THE SAME

FIELD OF THE INVENTION

The present invention relates to a sheet for a plasma display, which is suitable for inhibiting a reflection (or regular reflection) of an outside light on a display surface of a plasma display panel (PDP), and a process for producing the sheet.

BACKGROUND OF THE INVENTION

In recent years, as an image display apparatuses (or devices) which replaces a cathode-ray tube (CRT) display apparatuses (or devices), flat displays such as a liquid crystal display (LCD), an electroluminescence display (ELD), and a plasma display panel (PDP) have been developed positively. Among these flat displays, the PDP has attracted the attention as an image display apparatus (or device) suitable for a large screen despite being a flat panel. However, in the flat panel such as PDP, whitening (or white flow) of an image (in particular dark image) occurs on the screen surface, resulting in deterioration of daylight contrast (or contrast of bright environment). Moreover, light reflex of an outside light in the inside of the panel generates a reflection of the outside light. In particular, the PDP can display an image clearly in a dark environment into which an outside light does not enter, however, the PDP has conspicuous tendency that a display image cannot be visually recognized under a daylight (or light room) environment. Therefore, in spite of having high display precision, the PDP needs a density filter (black mask) to be interposed between pixels, or a dimmer filter to be disposed in front of the panel. However, such a black mask or dimmer filter disposed only improves visibility in a relatively dark inside of a house, and does not sufficiently enhance contrast in a light environment (for example, an office, a store or outlet, the outside of a house). Moreover, since luminance (or brightness) of an image is reduced in these methods, these methods require high power consumption in order to increase luminance (or brightness).

Japanese Patent Application Laid-Open No. 196128/2002 (JP-2002-196128A) discloses an optical filter for PDP, which comprises a transparent base material (or support), and an antireflection film or an infrared ray-shielding filter layer, wherein the antireflection film or the infrared ray-shielding filter layer is formed on one side of the base material, and the antireflection film contains an inorganic fine particle and comprises two layers different in refractive index from each other. However, in this optical filter, in the case forming the antireflection film, a reflection of an outside light cannot be sufficiently inhibited or interrupted. Moreover, use of the infrared ray-shielding filter brings about decrease in image luminance.

Moreover, Japanese Patent Application Laid-Open No. 319351/2002 (JP-2002-319351A) discloses a plasma display device comprising a filter having a film-like front and an anti-glare layer which are directly attached on the front side of the panel, wherein, the filter has an anti-magnetic layer comprising a coloring matter-containing adhesive material or a metal film, and being formed on a transparent base film, and the anti-glare layer sprinkles diffusion matter. However, even in the device, it is impossible to inhibit a reflection of an outside light without reducing image luminance.

Incidentally, Japanese Patent Application Laid-Open No. 504627/1994 (JP-6-504627A) discloses a plastic louver film as a privacy screen film for covering a screen of CRT or other displays, wherein the plastic louver film comprises a transparent layer comprising a cellulose acetate butyrate (CAB), and a dark layer comprising a CAB and a carbon black. This document describes that the dark layer comprises a central zone (or section) having a relatively high absorption coefficient and an outer zone (or section) adjacent to the central zone and having a relatively low absorption coefficient, that a ghost image due to light reflection can be reduced, and that a person other than an operating personnel cannot read a displayed data.

Moreover, Japanese Patent Application Laid-Open No. 70834/1978 (JP-53-70834A) discloses a skivable billet and a skivable product thereof, wherein the billet alternately arrays a low optical density layer comprising a cellulose acetate butyrate and a relatively high optical density layer comprising a composite self-crosslinking anionic acrylate, a finely divided silica and a water-soluble polyazo direct dye.

SUMMARY OF THE INVENTION

It is therefore an object of the present invention to provide a sheet for a plasma display panel (PDP) (or PDP sheet), which can display an image at a high contrast even under a light environment without reducing luminance of a plasma display, and a process for producing the same.

Another object of the present invention is to provide a PDP sheet which can inhibit a reflection of an outside light, and a process for producing the same.

It is still another object of the present invention to provide a PDP sheet which can be conveniently produced even in a large size, and a process for producing the same.

The inventor of the present invention made intensive studies to achieve the above objects and finally found that disposing a sheet having a laminative structure in which a transparent section (or sectional zone) and a dark section (or sectional zone) are alternately arranged in the direction of the sheet surface (or sheet plane), in front of a plasma display panel (display surface) ensures image display having a high contrast without decreasing luminance of the plasma display even under a daylight (or light) environment. The present invention was accomplished based on the above findings.

That is, the PDP sheet of the present invention is a resin sheet being disposed in front of the plasma display panel and transmitting a rectilinear light, wherein the sheet has a transparent section and a dark section adjacent to the transparent section, and the transparent section and the dark section are alternately arranged in the direction of the sheet surface. The sheet can inhibit a reflection (or regular reflection) due to an outside light entering from an oblique direction relative to the plasma display panel surface. The transparent section and the dark section may be perpendicular or inclined to the sheet surface with forming in layers. In the sheet, the thickness T of the sheet may be about 0.12 to 0.25 mm, the angle of the dark section to the sheet surface may be about 70 to 90°, the ratio [P/T] of the periodic width P of the dark section relative to the thickness T of the sheet may be about 1/1 to 1/2 (particularly about 1/1 to 1/1.8), and the ratio [$W_1/W_2$] of the width $W_1$ of the transparent section relative to the width $W_2$ of the dark section may be about 30/1 to 10/1. The sheet shows a maximum transmittance at an incident angle of about 60 to 90°. The sheet shows a half power angle of about 50 to 90° with respect to a transmittance. Further, the sheet may have a maximum transmittance of about 75 to 90% and a haze value of about 0.1 to 3%. The transparent section may comprise a soft resin, and the dark section may comprise a soft resin and a dark colorant. The soft resin constituting the dark section may be the same series as the soft resin constituting the transparent section. The soft resins constituting the transparent and dark sections may comprise, for example, an olefinic resin (particularly an ethylene-vinyl ester copolymer). The proportion of the dark colorant in the dark section may be about 1 to 5 parts by weight relative to 100 parts by weight of the soft resin.

The present invention also includes a process for producing the sheet, which comprises laminating a soft resin layer constituting a transparent section and a soft resin composition layer constituting a dark section alternatively, and slicing the multilayer mass in a direction intersecting with the laminating direction to obtain the sheet. Further, the present invention includes a plasma display panel provided with the sheet in front of the panel.

Throughout this description, the term "louver structure" sometimes means a structure in which a transparent section (or sectional zone) and a dark section (or sectional zone) are alternately arranged. The term "louver layer" means a dark section in some cases. Incidentally, the meaning of the term "transparent" includes transparent and translucent.

DETAILED DESCRIPTION OF THE INVENTION

Figure 1:
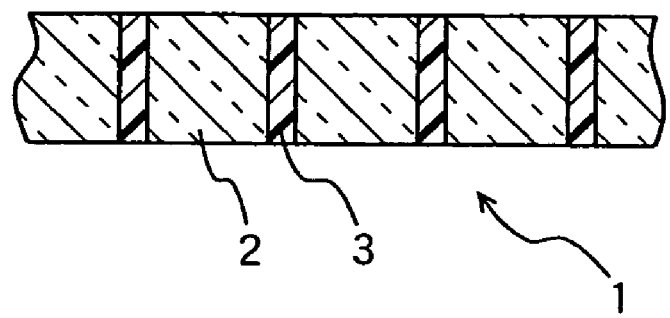
FIG. 1 is a schematic diagram showing the cross-sectional structure of the PDP sheet of the present invention.

The PDP sheet of the present invention is a multilayer sheet having a louver structure, in which a transparent section and a dark section are alternately (or periodically) arranged in a direction of a sheet surface.

[Transparent Section]

The transparent section (or zone) comprises a soft resin. The soft resin is not particularly limited to a specific one as far as the resin is transparent and soft, and includes, for example, a thermoplastic resin such as an olefinic resin, a halogen-containing resin (e.g., a vinyl chloride-vinyl acetate copolymer, a vinyl chloride-(meth)acrylate copolymer), a vinyl alcohol-series resin, avinyl ester-series resin (e.g., a polyvinyl acetate, a vinyl acetate-vinyl chloride copolymer, a vinyl acetate-(meth)acrylate copolymer), a (meth)acrylic resin (e.g., amethylmethacrylate-(meth)acrylic acid copolymer, a methyl methacrylate-(meth)acrylate-(meth)acrylic acid copolymer, a methyl methacrylate-(meth)acrylate copolymer), an aliphatic polyester-series resin (e.g., an aliphatic polyester obtained from an aliphatic dicarboxylic acid such as adipic acid), a polyamide-series resin (e.g., an aliphatic polyamide such as a polyamide 46, a polyamide 6, a polyamide 66, a polyamide 610, a polyamide 612, a polyamide 11, or a polyamide 12), and a thermoplastic elastomer. The soft resin may be a resin to which flexibility is imparted by blending a soft component (e.g., a thermoplastic elastomer or a plasticizer) to a hard resin in such a range that the transparency or clearness is not deteriorated, and for example, may be a blend of a polypropylene and a hydrogenerated styrene-butadiene rubber. The soft resin(s) may be used singly or in combination. Among these soft resins, an olefinic resin is preferred.

The olefinic resin includes a homo- or copolymer of an olefin. As the olefin, for example, there may be mentioned an $\alpha$-$C_{2-16}$olefin such as ethylene, propylene, 1-butene, isobutene, or 1-pentene (preferably an $\alpha$-$C_{2-10}$olefin, more preferably an $\alpha$-$C_{2-8}$olefin, and particularly an $\alpha$-$C_{2-4}$olefin). The olefin(s) may be used singly or in combination. Among these olefins, the preferred olefinic resin comprises a $C_{2-3}$olefin such as ethylene or propylene, particularly at least ethylene.

The olefinic resin may be a copolymer of an olefin and a copolymerizable monomer. Examples of the copolymerizable monomer include (meth)acrylic acid, a (meth)acrylate [e.g., a $C_{1-6}$alkyl (meth)acrylate such as ethyl (meth)acrylate], a vinyl ester (e.g., a vinyl ester of a $C_{2-4}$aliphatic carboxylic acid, such as vinyl acetate, or vinyl propionate), a diene (e.g., butadiene, isoprene), and others. The copolymerizable monomer(s) may be used singly or in combination. The ratio (molar ratio) of the olefin relative to the copolymerizable monomer [the olefin/the copolymerizable monomer] may for example be about 100/0 to 10/90, preferably about 99/1 to 30/7, and more preferably about 95/5 to 50/50.

The olefinic resin includes, for example, an ethylene-series (or ethylenic) resin [e.g., low- or middle-density polyethylene, a linear (or straight-chain) low-density polyethylene, an ethylene-propylene copolymer, an ethylene-butene-1 copolymer, an ethylene-propylene-butene-1 copolymer, an ethylene-(4-methylpentene-1) copolymer], a propylene-series resin (e.g., a propylene-ethylene copolymer, a propylene-butene-1 copolymer, a propylene-ethylene-butene-1 copolymer), and others. As the copolymer, for example, there may be mentioned an ethylene-vinyl acetate copolymer, an ethylene-vinyl alcohol copolymer, an ethylene-(meth)acrylic acid copolymer or an ionomer thereof, and an ethylene-(meth)acrylate copolymer such as an ethylene-ethyl acrylate copolymer.

The copolymer (an olefin-olefin copolymer, and a copolymer of an olefin and a copolymerizable monomer) may be a graft copolymer, and is usually a random copolymer, or a block copolymer.

The olefinic resin(s) may be used singly or in combination. Among these olefinic resins, a $C_{2-3}$olefinic resin, particularly an ethylene-vinyl ester copolymer (e.g., an ethylene-vinyl acetate copolymer), is preferred.

The transparent section may comprise a conventional additive, for example, a plasticizer, a stabilizer (e.g., an ultraviolet ray absorbing agent, an antioxidant, a heat stabilizer), an antistatic agent, a flame retardant, a coloring agent, a dispersing agent, and others.

[Dark Section]

The dark (or dark-color) section or zone (louver layer) comprises a soft resin and a dark colorant (or dark dye or pigment). As the soft resin, a soft resin being the same series as a soft resin constituting the transparent section (or the same soft resin) is preferred, and the soft resin as exemplified in the paragraph of the transparent section may be used.

It is sufficient that the dark colorant has a light shielding (or shading) effect. For example, there may be used a deep-color colorant (e.g., an organic black colorant, or an inorganic black colorant) having a brightness of about 0 to 5, and preferably about 0 to 3. The dark colorant(s) may be used singly or in combination. The black colorant may be an organic black colorant (e.g., an azoic direct dye), and an inorganic black colorant (in particular an inorganic black pigment) may be preferably used. Moreover, if necessary, the black colorant may be used in combination with an achromatic colorant (a white pigment such as titanium oxide or calcium carbonate), or a chromatic colorant.

Examples of the inorganic black pigment include a carbon black (e.g., an acetylene black, an oil black, a gas black, a lampblack, a thermal black, a furnace black, a channel black, Ketjen black), a graphite, a titanium black, black iron oxide, and others. The inorganic black pigment(s) may be used singly or in combination. Among them, a carbon black is particularly desirable from the viewpoint of dispersibility to the soft resin or versatility.

The mean particle size of the inorganic black pigment (e.g., a carbon black) may for example be about 10 to 100 nm, preferably about 15 to 90 nm, and more preferably about 20 to 80 nm.

The proportion of the dark colorant is not particularly limited to a specific one as far as the dark colorant does not induce deterioration of sheet strength, or deterioration of adhesiveness to the adjacent transparent section. The proportion of the dark colorant may for example be about 1 to 5 parts by weight, preferably about 1.5 to 4.5 parts by weight, and more preferably about 2 to 4 parts by weight relative to 100 parts by weight of the soft resin. If the proportion of the dark colorant is in such a range, the sheet can demonstrate light blocking effect without spoiling image quality due to the interface reflection between the dark section and the transparent section.

The dark section may also comprise a conventional additive exemplified in the paragraph of the transparent section.

[Structure of Sheet]

Figure 2:
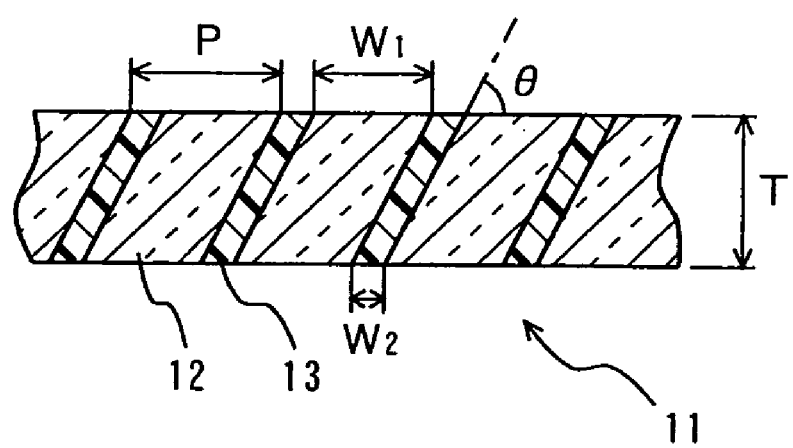
FIG. 2 is a schematic diagram showing the cross-sectional structure of another PDP sheet of the present invention.

FIG. 1 is a schematic diagram showing the cross-sectional structure of the PDP sheet of the present invention. As illustrated in FIG. 1, in a PDP sheet 1, a transparent section 2 and a dark section (louver layer) 3 are alternately arranged (or formed) in layers. In this embodiment, the dark section 3 is orthogonally set to the sheet surface. FIG. 2 is a schematic diagram showing the cross-sectional structure of PDP sheet in another embodiment of the present invention. As shown in FIG. 2, a PDP sheet 11 is formed so that a transparent section 12 and a dark section 13 have an inclination of a predetermined angle θ (°) to the sheet surface (or sheet plane). As shown in FIG. 1 and FIG. 2, the PDP sheet of the present invention has a louver structure in which louver layers as a dark section are formed in layers at equal intervals.

In order to transmit a rectilinear light and display an image which has high contrast even under daylight or light environment, it is sufficient that the thickness T of the sheet, the angle θ of the dark section to the sheet surface, the ratio of the width $W_1$ of the transparent section relative to the width $W_2$ of the dark section, and the periodical width P of the dark section are adjusted with correlating with each other.

The angle θ of the dark section to the sheet surface may be in such a range that a reflection of an outside light is effectively inhibited without reducing luminance of an image. Such an angle θ may be selected from an angle of about 70 to 90° as usage. Incidentally, an angle of the sheet showing a maximum transmittance is dependent on the angle θ, and is, for example, about 60 to 90°.

In the case where a display screen is attached to a place higher than eye view (for example, a public or advertising display), the display screen is preferably attached to be inclined in a direction parallel to the eye-view direction and the angle θ is about 70 to 85°, preferably about 70 to 80°. By setting the angle θ within this range, the angle showing a maximum transmittance is about 60 to 80°, and preferably 60 to 75°. Accordingly, even when the display screen is looked upward from downward, the incidence of a upper light source (e.g., sunlight, a fluorescent lamp) to the display screen can be effectively inhibited without causing luminance reduction.

In the case where the display screen is attached to a place as the same height as the eye view (for example, a home television), the angle θ is preferably set to substantially 90°. Since an angle showing a maximum transmittance also becomes substantially 90° by adjusting the angle θ to 90°, the display screen shows the highest luminance from the front with effectively inhibiting incidence of an upper light source (e.g., a fluorescent lamp) to the display screen.

The half power angle with respect to the transmittance may for example be about 50 to 90°, preferably about 50 to 80°, and more preferably about 50 to 70°, from the viewpoint that the only outside light is effectively cut without deteriorating a wide viewing angle property of the plasma display. The half power angle means an angle range in which a transmittance not less than a half value of a maximum transmittance is shown (that is, a width of a half power angle). In order to use the sheet for cutting an outside light efficiently or in an application for looking from a limited angle (e.g., in the case putting the display in a vertical direction), the half power angle is preferably narrow.

The thickness T of the sheet may be selected within a range from about 0.12 to 0.25 mm, and may be preferably about 0.13 to 0.24 mm, and more preferably about 0.15 to 0.23 mm. In the case where the thickness of the sheet is in this range, the wide viewing angle property and the shielding property of an outside light are compatible.

The width $W_1$ of the transparent section may be selected within a range from about 0.05 to 0.2 mm, and may be preferably about 0.07 to 0.18 mm, and more preferably about 0.1 to 0.17 mm. The width $W_2$ of the dark section may be about 0.005 to 0.02 mm, preferably 0.007 to 0.018 mm, and more preferably about 0.01 to 0.017 mm. The dark section having a width $W_2$ in such a range can sufficiently shield an outside light without lowering display luminance.

The ratio $[W_1/W_2]$ of the width $W_1$ of the transparent section relative to the width $W_2$ of the dark section may be selected within a range from about 30/1 to 5/1. The $W_1/W_2$ may be preferably about 30/1 to 10/1, and more preferably about 20/1 to 10/1 (particularly about 15/1 to 10/1).

The periodical width P of the louver layer may be about 0.05 to 0.2 mm, preferably about 0.07 to 0.18 mm, and more preferably about 0.1 to 0.17 mm. When the periodical width P is in such a range, the image quality becomes clear or sharp without causing moire between the louver layer and a pixel pitch or interference by the louver layers.

The ratio [P/T] of the periodical width P relative to the thickness T of the sheet may be selected within a range from about 1/1 to 1/2, and may be preferably about 1/1 to 1/1.8, and more preferably about 1/1 to 1/1.6.

In order to apply the sheet of the present invention to PDP as a louver sheet for intercepting an outside light effectively, for example, when the thickness T of the sheet is 0.12 to 0.25 mm (particularly 0.13 to 0.24 mm) and the angle θ is 70 to 90°, the ratio [P/T] of the periodical width P of the louver layer relative to the thickness T of the sheet may be selected within a range from about 1/1 to 1/2 (particularly about 1/1 to 1/1.8) and the ratio [$W_1/W_2$] of the width $W_1$ of the transparent section relative to the width $W_2$ of the dark section may be selected within a range from about 30/1 to 10/1 (particularly about 20/1 to 10/1).

A protective layer may be formed on one side or both sides of the sheet to protect the surface of the sheet. The protective layer is not particularly limited to a specific one as long as the layer is transparent, and includes the soft resin as exemplified in the paragraph of the transparent section, in addition other transparent resin(s) (e.g., a styrenic resin, a polycarbonate-series resin), a transparent material (e.g., an inorganic material such as a glass), and others. Among them, from the viewpoint of adhesiveness to the sheet, it is preferred to use a resin being the same series (or the same) as the soft resin constituting the transparent section. The thickness of the protective layer may be about 0.003 to 0.1 mm, preferably about 0.005 to 0.05 mm, and more preferably about 0.01 to 0.03 mm.

The maximum transmittance of the sheet is preferably not less than 75%, and for example, is about 75 to 90%, and particularly about 80 to 90%. When the maximum transmittance of the sheet is in this range, an image is displayed clearly or distinctly without reducing of luminance.

The haze value of the sheet is preferably not more than 3%, and for example, is about 0.1 to 3%, preferably about 0.3 to 2%, and more preferably 0.5 to 1.5%. In the case where the haze value is within this range, the image quality becomes clear or sharp without causing unclearness of the image. In order to let the haze value be within such a range, for example, a resin having higher transparency (or clearness) may be used, or the concentration of the dark colorant may be lowered to inhibit scattering by the interference of the adjacent dark section.

[Process for Producing Sheet]

The PDP sheet may for example be produced by laminating a layer of a soft resin constituting a transparent section (or soft resin layer) and a layer of a soft resin composition constituting a dark section (or soft resin composition layer) to weld to each other, and slicing or cutting thus obtained multilayer (or laminated) mass at a given thickness in a direction intersecting with the laminating direction. Incidentally, the laminated surface of the multilayer mass having a plurality of layers may be orthogonalized or inclined to the slicing face.

Figure 3:
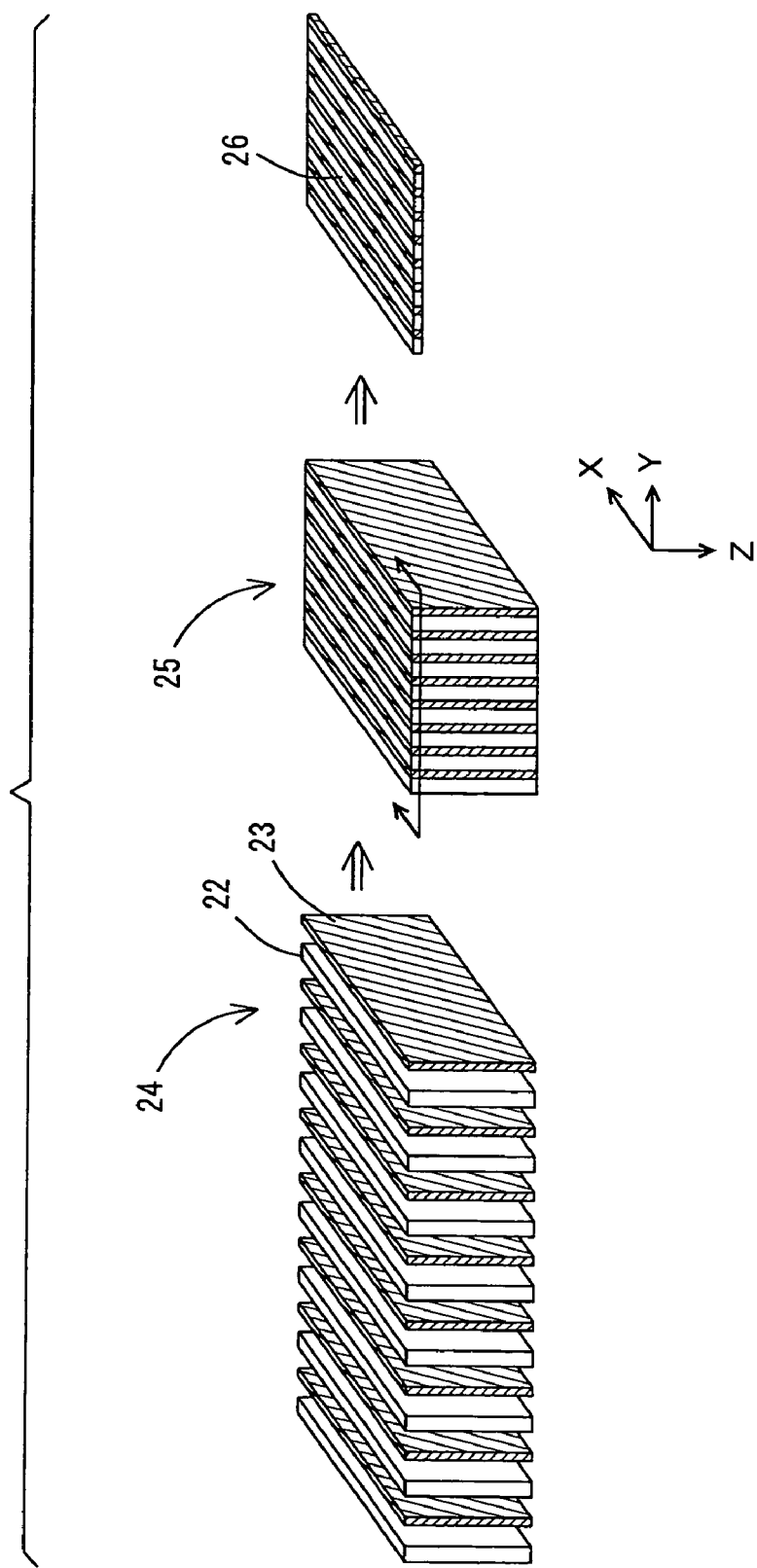
FIG. 3 is a schematic flow chart for explaining a production process of the PDP sheet of the present invention.

FIG. 3 is a schematic flow chart for explaining a production process of the present invention. In this embodiment, a PDP sheet 26 is prepared by laminating or arraying a transparent resin sheet 22 constituting a transparent section and a dark resin sheet 23 constituting a dark section (louver layer) alternately with setting the direction of the laminated surface toward approximately vertical to the horizontal plane to form a multilayer mass 24; welding and uniting the multilayer mass 24 with heating to give a welded multilayer (or lamination) block 25; and slicing the welded multilayer block 25 at a given thickness to a direction intersecting with the laminated surface (or plane).

Such a process can provide a louver sheet 26 for a PDP, in which the transparent section and the dark section are formed at an angle of about 90° to the sheet surface.

Figure 4:
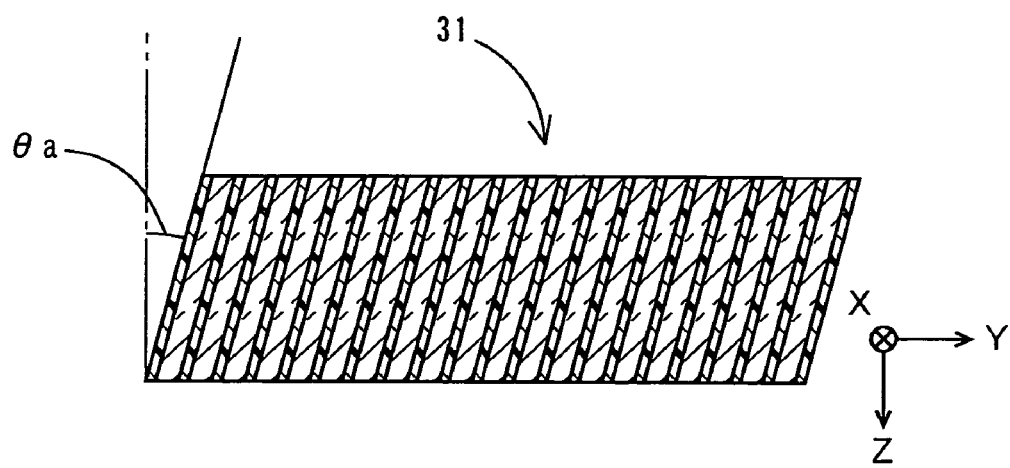
FIG. 4 is a schematic cross-sectional view of a welded multilayer block for explaining another production process of the PDP sheet of the present invention.

FIG. 4 is a schematic view of a multilayer mass for explaining another production process of the present invention. In this embodiment, in a multilayer mass 31, a transparent resin sheet and a sheet containing a dark colorant are alternately laminated (or layered) at an angle of θa. That is, in a multilayer mass obtained from a plurality of sheets, the lateral face is inclined at an angle of θa, and a welded multilayer block is prepared by heating the multilayer mass with keeping angles of inclination on both lateral sides.

Such a preparation of the welded multilayer block with inclining the lateral side of the block-like multilayer mass ensures a louver sheet having a transparent section and a dark section both inclining (or tilting) to the sheet surface, by slicing the welded multilayer block in the direction of an upper end or a lower end. Moreover, the angle of inclination of the transparent section and the dark section to the sheet surface may be easily controlled by the inclination angle in the lateral side of the welded multilayer block.

Figure 5:
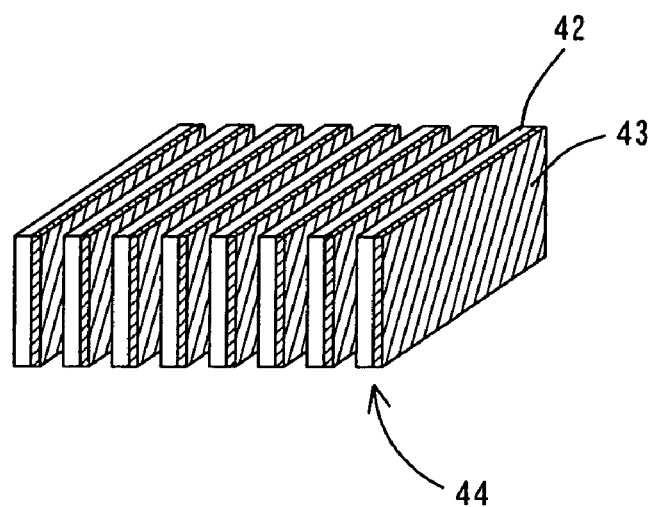
FIG. 5 is a schematic diagram for illustrating one step of another production process of the present invention.

Incidentally, the multilayer mass may be obtained by laminating continuously or intermittently with the use of extrusion laminating, multilayer co-extrusion, or other means in a sheet-forming or molding method such as extrusion molding. In such a method, a welded multilayer block can be obtained along with laminating. Further, lamination may be conducted by coating. For example, as shown in FIG. 5, a preliminary multilayer mass 44 may be prepared by coating a transparent resin sheet 42 constituting a transparent section with a liquid coating composition containing a dark colorant and a soft resin to form a dark section 43 on the transparent resin sheet 42, and the preliminary multilayer mass 44 may be laminated or arrayed sequentially.

The transparent resin sheet and the dark resin sheet may be created by various methods. For example, such a sheet may be obtained by extrusion molding a transparent resin (or a transparent resin and a dark colorant) with or after melt-kneading, or may be molded by pressing a melting product of a transparent resin (or a transparent resin and a dark colorant) with or without heating. Further, such a sheet may be molded by other manners, for example a calendar processing, an injection molding, a cast method in accordance with flow casting of a solvent-containing dope, or and others.

The slicing or cutting direction may be a direction intersecting with the laminated surface of the multilayer mass. Assuming the direction of the laminated surface (the plane of the multilayer mass) as X-axial direction, the laminating direction as Y-axial direction, and the thickness direction of the multilayer mass perpendicular to or intersecting with the laminating direction as Z-axial direction, the welded multilayer block is often sliced along a plane in an angle range of about 70 to 90° with a central focus on the X-Y plane of the welded multilayer block, in particular along substantial X-Y plane.

Further, the melting point or softening temperature of the soft resin constituting the transparent section and the melting point or softening temperature of the resin composition constituting the dark section are preferably in the following range correlating with the fabrication temperature of the multilayer mass (the processing temperature of slicing or cutting).

"Melting point or softening temperature of the dark section<Fabrication temperature<Melting point or softening temperature of the transparent section"

The fabrication temperature in the above formula means a processing temperature for slicing or cutting the multilayer mass. In the case where the melting point or softening temperature of the both layers is in the above-mentioned range, the slicing or cutting process of the sheet is conducted smoothly, as a result a PDP sheet having a louver structure can be produced conveniently.

Since thus obtained sheet has the louver structure, the sheet can transmit a rectilinear light and shield an outside light entered from an oblique direction relative to the panel surface (or plane). Therefore, setting the sheet in front of the plasma display panel significantly improves visibility of the plasma display. That is, without reducing the front (or transverse) luminance of the display, the reflection of the outside light can be inhibited and contrast of display image can be improved even under light environment. Further, since the sheet can be conveniently produced even in scaling up, the sheet is suitable for a PDP sheet.

The PDP sheet of the present invention is disposed in front of a PDP. In front of the PDP, is usually disposed a front filter formed by laminating an anti-specular reflection layer, a band pass filter, an electromagnetic interference shield layer, a tempered glass, and others. The method for disposing the PDP sheet includes, for example, a method of incorporating the PDP sheet in this front filter, a method of pasting (or sticking) the PDP sheet to the front side of the front filter, a method of setting the PDP sheet as a different filter to the front side of the front filter, and other methods.

In the method of incorporating the PDP sheet in the front filter, the position of the PDP sheet to be incorporated is exemplified by the following embodiment (1) to (4). Incidentally, the front filter in the following embodiment (1) to (4) is disposed so that the anti-specular reflection layer becomes the obverse side.

(1) Anti-specular reflection layer/PDP sheet/Band pass filter/ Electromagnetic interference shield layer/Tempered glass
(2) Anti-specular reflection layer/Band pass filter/PDP sheet/ Electromagnetic interference shield layer/Tempered glass
(3) Anti-specular reflection layer/Band pass filter/Electromagnetic interference shield layer/PDP sheet/Tempered glass
(4) Anti-specular reflection layer/Band pass filter/Electromagnetic interference shield layer/Tempered glass/PDP sheet As the method of pasting (or sticking) the PDP sheet to the front side of the front filter, there may be mentioned a method of pasting (or sticking) a sheet laminated with the anti-specular reflection layer/a hard coat layer/the PDP sheet in this order in view of the obverse side to the front filter through an adhesive layer, and other methods.

The method of attaching the PDP sheet as a different filter to the front side of the front filter includes, for example, a method of attaching a filter laminated with the anti-specular reflection layer/the PDP sheet/a transparent resin sheet (an acrylic resin sheet such as a poly(methyl methacrylate)) in this order in view of the obverse side to the front side of the front filter, and other methods.

The PDP sheet may have function(s) of the front filter (e.g., fineness-improvement in a red image by band pass, infrared ray-shielding function, antistatic function).

According to the present invention, a sheet having a louver structure in which a transparent section and a dark section are alternately arranged ensures image display at high contrast without decreasing luminance of a plasma display even under a daylight environment. Moreover, the sheet inhibits a reflection of an outside light (e.g., illumination lamp, sunlight) by shielding the outside light. Further, the sheet can be conveniently produced even in a large size.

EXAMPLES

The following examples are intended to describe this invention in further detail and should by no means be interpreted as defining the scope of the invention.

Example 1

<Production of Primary Sheet>

A resin composition obtained by adding 3 parts by weight of a carbon black ("SPECIAL BLACK 250" manufactured by Degussa AG) to 97 parts by weight of an ethylene-vinyl acetate copolymer ("Ultrathene 637" manufactured by Tosoh Corporation) and kneading the mixture at 160° C., and a transparent resin comprising an ethylene-vinyl acetate copolymer ("Ultrathene 637" manufactured by Tosoh Corporation) were co-extruded at 160° C. to give a bilayer sheet having a dark layer comprising the resin composition and a transparent layer comprising the transparent resin. The thickness of the bilayer sheet was 0.132 mm, the length of the width direction was 10 cm, and the thickness ratio of each layer [the dark layer/the transparent layer] was 1/10. Hereinafter, as a coordinate system, the extrusion direction of the primary sheet was considered as X-axis.

<Block fabrication and Slicing>

The primary sheet was cut off by a length of 110 cm along the X-axial direction to make strips, and about 5000 pieces of the strips were laminated in the almost vertical direction. The multilayer mass was heated to 90° C. with pressing the both sides and the upper side thereof to weld the strips of the multilayer mass each other, and a welded multilayer block (block) was produced. Incidentally, as a coordinate system, the laminating direction of this block and the height direction thereof were defined as Y-axial direction and Z-axial direction, respectively. The size of thus obtained block was 110 cm in the X-axial direction, 70 cm in the Y-axial direction, and 10 cm in the Z-axial direction. This block was cut into slices having a thickness of 0.19 mm along the X-axial direction (X-Y plane) so that the Z-axial direction was defined as the thickness direction to obtain a sheet having a length of 110 cm and a width of 70 cm. Thus obtained sheet was sandwiched between glossy plates, and pressed at 85° C. to smooth slice stripes slightly left on the reverse face of the sheet.

In this sheet, a dark section comprising the resin composition and a transparent section comprising the transparent resin are alternately arranged. The angle of the dark section to the sheet surface was 80°. The periodical width P of the dark section was 0.132 mm, the width $W_2$ of the dark section was 0.012 mm, and the width $W_1$ of the transparent section was 0.012 mm. The ratio [P/T] of the periodical width P relative to the thickness T of the sheet was 0.68, and the ratio [$W_1/W_2$] of $W_1$ relative to $W_2$ was 10/1. Moreover, the haze value of the sheet was measured as 1%.

Figure 6:
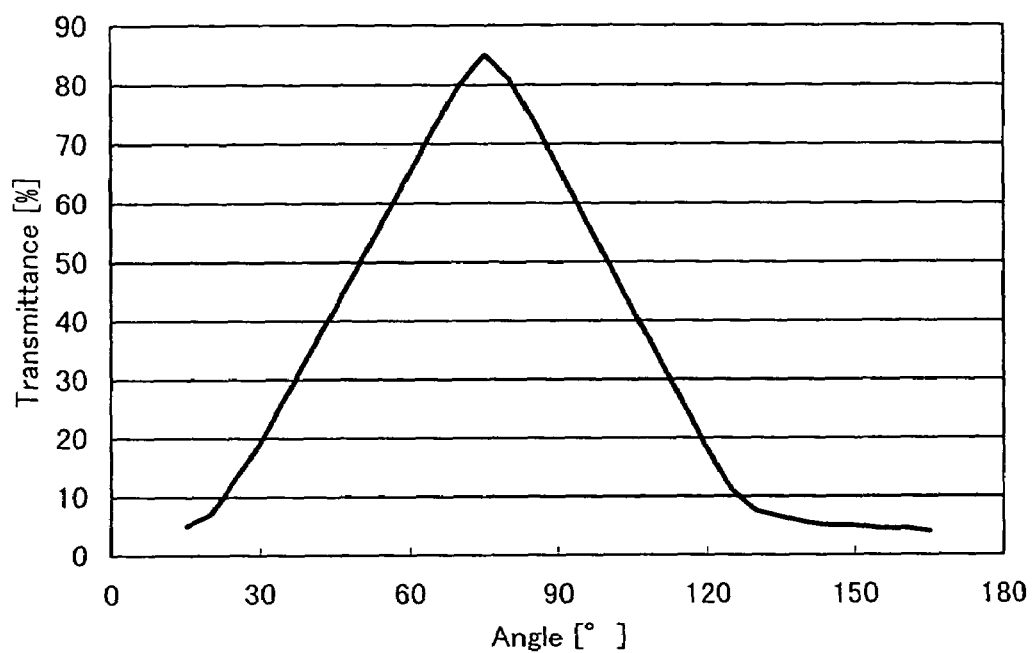
FIG. 6 is a graph showing the relationship between an angle and a transmittance in the sheet obtained in Example 1.

Further, the transmittance of the sheet was measured with rotating the sheet round the X-axis as a rotation axis. The results are shown in FIG. 6.

The results revealed that the maximum transmittance of the sheet was 85%, the angle showing the maximum transmittance was 75°, and the half power angle with respect to the transmittance was 60°.

The sheet was attached to a front panel of a 42-inch plasma display having a transmittance of 50% through an adhesive. The plasma display was hung on a wall of a small conference room at 2 m height. Then, all ceiling fluorescent lamps were switched on, the luminance of the white image and the contrast of the white/dark image were measured at a distance of 1 m from the plasma display. The luminance and the white/black contrast were 380 cd/m$^2$ and 150/1, respectively.

Comparative Example 1

Measuring the luminance of the white image and the white/black contrast in the same manner as in Example 1 except for using a plasma display equipped with a front panel having a transmittance of 40%, the luminance and the white/black contrast were 360 cd/m$^2$ and 40/1, respectively.

What is claimed is:

1. A resin sheet suitable for being disposed in front of a plasma display panel and transmitting a rectilinear light, wherein
   the sheet has a transparent section and a dark section adjacent to the transparent section,
      the transparent section and the dark section are alternately arranged in the direction of the sheet surface,
      the transparent section comprises a soft resin, and the dark section comprises a soft resin and a dark colorant, and the soft resins constituting each of the transparent and dark sections comprise at least one member selected from the group consisting of an olefinic resin, a halogen-containing resin, a vinyl alcohol-series resin, a vinyl ester-series resin, a (meth)acrylic resin, an aliphatic polyester-series resin, a polyamide-series resin, and a thermoplastic elastomer,
   the ratio [P/T] of the periodic width P of the dark section relative to the thickness T of the sheet is 1/1 to 1/1.8, and
   the ratio [$W_1/W_2$] of the width $W_1$ of the transparent section relative to the width $W_2$ of the dark section is 30/1 to 10/1.

2. A sheet according to claim 1, wherein the transparent section and the dark section are perpendicular or inclined to the sheet surface and are alternatively arranged in layers.

3. A sheet according to claim 1, wherein the thickness T of the sheet is 0.12 to 0.25 mm, and the angle of the dark section to the sheet surface is 70 to 90°.

4. A sheet according to claim 1, which shows a maximum transmittance at an incident angle of 60 to 900°.

5. A sheet according to claim 1, which shows a half power angle of 50 to 90° with respect to a transmittance.

6. A sheet according to claim 1, which has a maximum transmittance of 75 to 90% and a haze value of 0.1 to 3%.

7. A sheet according to claim 1, wherein the soft resin constituting the dark section is the same series as the soft resin constituting the transparent section.

8. A sheet according to claim 1, wherein the soft resins constituting the transparent and dark sections comprise an olefinic resin.

9. A sheet according to claim 1, wherein, in the dark section, the proportion of the dark colorant is 1 to 5 parts by weight relative to 100 parts by weight of the soft resin.

10. A sheet according to claim 1, which inhibits a reflection due to an outside light entering from an oblique direction relative to the plasma display panel surface, wherein the transparent section comprises an ethylene-vinyl ester copolymer, the dark section comprises an ethylene-vinyl ester copolymer and a black pigment, the thickness T of the sheet is 0.13 to 0.24 mm, the angle of the dark section to the sheet surface is 70 to 90°, and the ratio [$W_1/W_2$] of the width $W_1$ of the transparent section relative to the width $W_2$ of the dark section is 20/1 to 10/1.

11. A process for producing a sheet recited in claim 1, which comprises laminating a soft resin layer constituting a transparent section and a soft resin composition layer constituting a dark section alternatively, and slicing the multilayer mass in a direction intersecting with the laminating direction to obtain the sheet.

12. A plasma display panel provided with a sheet recited in claim 1 in front of the panel.

* * * * *

UNITED STATES PATENT AND TRADEMARK OFFICE
CERTIFICATE OF CORRECTION

PATENT NO. : 7,083,292 B2
APPLICATION NO. : 10/790072
DATED : August 1, 2006
INVENTOR(S) : Hiroyuki Takemoto It is certified that error appears in the above-identified patent and that said Letters Patent is hereby corrected as shown below:

Column 11, line 34, *should read*:
the sheet surface and are alternately arranged in layers.

Column 12, line 2, *should read*:
transmittance at an incident angle of 60 to 90°.

Signed and Sealed this

Ninth Day of January, 2007

JON W. DUDAS
*Director of the United States Patent and Trademark Office*